United States Patent [19]

Adair

[11] Patent Number: 4,880,180

[45] Date of Patent: Nov. 14, 1989

[54] TAPE REEL

[75] Inventor: Henry Adair, Mission Viejo, Calif.

[73] Assignee: Memorex Corporation, Irvine, Calif.

[21] Appl. No.: 223,945

[22] Filed: Jul. 25, 1988

[51] Int. Cl.⁴ .......................................... B65H 75/18
[52] U.S. Cl. .................................................. 242/71.8
[58] Field of Search ..................... 242/71.8, 71.9, 116, 242/118.4, 118.7

[56] References Cited

U.S. PATENT DOCUMENTS

| | | | |
|---|---|---|---|
| 3,088,689 | 5/1963 | Perlini | 242/71.8 |
| 3,236,473 | 2/1966 | Hultgren | 242/71.8 |
| 3,289,965 | 12/1966 | Cuva | 242/71.8 |
| 3,327,960 | 6/1967 | Hedin | 242/71.8 |
| 3,342,435 | 9/1967 | Gelardi et al. | 242/71.8 |
| 3,438,592 | 4/1969 | Posso | 242/71.8 |
| 3,819,124 | 6/1974 | Marks et al. | 242/71.8 |
| 4,052,020 | 10/1977 | Knox | 242/71.8 |
| 4,083,508 | 4/1978 | Pattillo | 242/68.5 |
| 4,083,509 | 4/1978 | Vasudeva et al. | 242/71.8 |
| 4,088,278 | 5/1978 | Adair | 242/71.8 |
| 4,184,650 | 1/1980 | Nelson et al. | 242/71.8 |
| 4,244,535 | 1/1981 | Moodie | 242/71.8 |
| 4,564,156 | 1/1986 | Cybulski | 242/197 |

Primary Examiner—Stuart S. Levy
Assistant Examiner—Steven M. duBois
Attorney, Agent, or Firm—Burns, Doane, Swecker & Mathis

[57] ABSTRACT

A reel for magnetic recording tape having a hub with flange attachment areas and a pair of clear plastic flanges, each having contact surfaces complementary to the hub attachment areas, the contact surfaces each having a pair of radially spaced circumferential ridges which serve as energy directors to ultrasonically weld the flanges to the hub and which contain adhesive within the annular region between the ridges to secure the flanges to the hub and to prevent eventual contamination of the tape on the reel due to migration of the adhesive.

11 Claims, 1 Drawing Sheet

U.S. Patent
Nov. 14, 1989
4,880,180
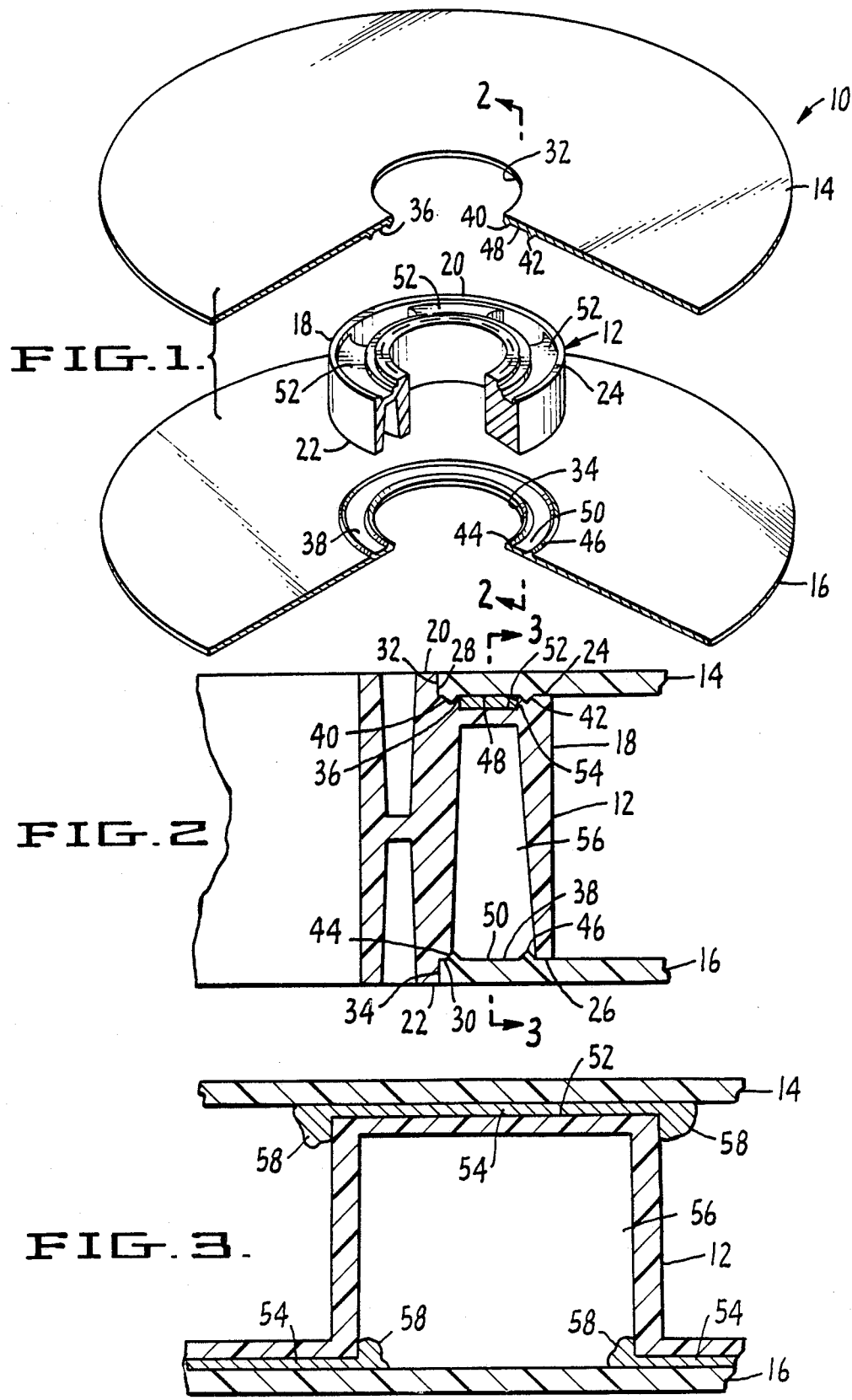

TAPE REEL

BACKGROUND OF THE INVENTION

1. Field of the Invention

The invention relates to a tape reel and particularly to a reel for storing magnetic tape such as that used in conjunction with computers.

2. Prior Art

In the past, magnetic tape reels have generally comprised either a metallic hub with attached spaced apart metallic flanges, or an all plastic reel having both a plastic hub and plastic flanges.

More recently, glass flanges have been used with a metal hub to provide the user with the ability to view the tape pack through the flange. Such a product, however, is disadvantageous due to its high production cost and impact strength problems associated with the glass material.

Another commercially available reel is an all metal reel; it requires additional fastening hardware for assembly and has the further disadvantage that the tape pack cannot be viewed through the metal flange unless a window is provided. Windows in the flanges are problematic due to the danger of contamination through such a window. In addition, a metal reel lacks resilience and can bend if it is dropped. Any distortion of the reel will compromise performance of the reel.

An all plastic tape reel is illustrated in Applicant's U.S. Pat. No. 4,088,278 which discloses a tape reel specially designed to resist compressive deformation of the surface upon which the tape is wound. A tape reel of this type is fabricated by means of adhesive bonding or by means of ultrasonic welding. U.S. Pat. No. 4,052,020 discloses a reel with plastic flanges and a hub of somewhat elastic plastic material. The reel is assembled, as shown in FIG. 10, by sonic welding and by a solvent bond. The combination of these assembly expedients, however, creates significant problems associated with the migration of bonding materials to the tape and weakening of the plastic material by the solvent.

Sonic welding is an efficient and economical method of fabricating an all plastic reel but may not provide the holding strength required for a large diameter, high performance reel. Solvent bonding is convenient but can compromise the strength of the plastic materials joined. Excess solvent can stress relieve the plastic materials in the area of the joint and cause the assembly to crack. A combination of these joining techniques, as taught by the prior art, presents the problem of eventual bonding materials contamination of the magnetic tape.

It would therefore be highly advantageous to have an all plastic reel having flanges of high transparency such as in a glass reel, yet which is as economical as a metal reel to produce and which could be assembled without the use of associated fastener hardware such as screws, and which preferably uses adhesive and ultrasonic welding in an effective manner to secure the components to each other and to at the same time assure isolation of the adhesive from contaminating the magnetic tape that will be wound upon the reel.

SUMMARY OF THE INVENTION

The purpose of the instant invention is to provide a high performance, large diameter tape reel having flange clarity, impact strength, and lower production cost than that associated with glass reels, which could be assembled without the use of fasteners, and designed to avoid contamination of the magnetic tape with the assembly materials. To accomplish this purpose, there is provided a reel having a hub with flange attachment surfaces and a pair of parallel spaced, disk shaped flanges of plastic material having adequate light transmission characteristics, the flanges having contact surfaces complementary to the attachment areas of the hub, the contact surfaces having radially spaced circumferential ridges defining an annular region therebetween, the ridges being in contact with the attachment areas to define energy directors to ultrasonically weld the flanges to the hub, and further including adhesive means contained within the annular regions to permanently attach the flanges, the ridges containing and thereby preventing the adhesive means from flowing and eventually migrating to the tape that will be stored upon the hub between the flanges.

An aspect of the invention is a reel for magnetic recording tape comprising: a hub of cylindrical configuration having an outside circumference and parallel end surfaces, an outer circumferential portion of each end surface defining attachment areas; a pair of parallel spaced apart, disk shaped flanges each having an opening therethrough, an inner circumferential portion of said flange thereof defining a contact surface complementary to the attachment area of said hub, said contact surfaces each having a pair of radially spaced circumferential ridges defining an annular region therebetween, said ridges being in contact with said attachment areas, the ridges defining energy directors to ultrasonically weld said flanges to said hub; and adhesive means within said annular regions to permanently attach said flanges to said hub, said adhesive means being contained within said annular regions to prevent said adhesive means from migrating radially outwardly toward said flanges and the tape that may be wound onto said hub between said flanges.

DESCRIPTION OF THE DRAWING

FIG. 1 is an exploded perspective view of the reel of the instant invention;

FIG. 2 is an enlarged partial cross-sectional view taken along section line 2—2 in FIG. 1 of the flanges and hub in assembled position;

FIG. 3 is a partial cross-sectional view taken along section line 3—3 in FIG. 2.

DESCRIPTION OF THE PREFERRED EMBODIMENT

With continued reference to the drawing, FIG. 1 illustrates a reel, shown generally at 10, for magnetic recording tape. The reel 10 includes a hub 12 and a pair of parallel spaced apart, disk shaped flanges 14 and 16. FIG. 1 is an exploded view showing the alignment and interface of the flanges and the hub. FIG. 2 is an enlarged partial cross-sectional view of the assembled components.

It can be seen that the hub 12 is of cylindrical configuration having an outside circumference 18 and parallel end surfaces 20 and 22. An outer circumferential portion of each end surface 20 and 22 defines attachment areas 24 and 26. It can be seen in FIG. 2 that the hub 12 is preferably axially recessed at 28 and 30 to allow the flanges 14 and 16 to fit flush with respect to the end surfaces 20 and 22. It is within the scope of the invention to have the flanges 14 and 16 abut the ends of the hub 12 without recesses.

Flanges 14 and 16 each have a through opening, 32 and 34 respectively, wherein an inner circumferential portion of each flange defines a contact surface, 36 and 38 respectively, which is generally complementary in dimension to the attachment areas 24 and 26 of the hub 12. Each contact surface 36 and 38 has a pair of radially spaced circumferential ridges 40, 42 and 44, 46 which define annular regions 48 and 50 therebetween. The ridges 40, 42, 44 and 46 are in contact with the attachment areas 24 and 26. The ridges are hereinafter defined as being energy directors for the purpose of ultrasonically welding the flanges 14 and 16 to the hub 12. As seen in FIG. 2, by comparing the ridge pair 40, 42 with the ridge pair 44, 46, the ridge pair 40 and 42 has been ultrasonically welded to the hub 12.

The attachment areas 24 and 26 include adhesive retention groove 52 to receive adhesive means 54 within the adhesive retention groove 52 to permanently attach the flanges 14 and 16 to the hub 12. The adhesive retention groove 52 is opposite the contact surfaces 36 and 38 and is between the ridges 40, 42, 44 and 46. The adhesive means 54 is contained within the annular regions, is located in the adhesive retention groove 52, and is prevented from migrating radially out along the interface of the flanges 14 and 16 and the hub 12 toward tape that may be wound upon the hub 12 between the flanges 14 and 16. Adhesive means 54 is contained by the ridges 40, 42, 44 and 46 (earlier defined as energy directors) which ultrasonically weld the flanges 14 and 16 to the hub 12. The figures also illustrate that the hub 12 contains circumferentially staggered core areas which alternate from one end surface 20, 22 to the other to accommodate the injection molding of the hub 12 with a minimum amount of materials. These core areas make the adhesive retention groove 52 discontinuous. As can be seen in FIGS. 2 and 3, the cores, such as core 56, provide a region for excess adhesive means 54 to flow during assembly by ultrasonic welding of the ridges/energy directors. The excess 58 spills over at the edge of the cores and the adhesive retention groove 52, and is isolated between the ridges 40, 42, 44 and 46.

The reel assembly process consists of applying adhesive means 54 to both sides of the hub 12. The adhesive means 54 is contained in the adhesive retention groove 52 and is positioned between the ridges 40, 42, 44 and 46, also defined as energy directors. The energy directors will permit the ultrasonic welding of the three components together by conventional ultrasonic welding techniques. The separation strength of the three components will be the combination of sonic welding and the adhesive means. The flange energy directors are positioned radially on both sides of the adhesive means and will prevent the lateral flow of excess adhesive means toward the tape path and the hub's inside diameter. As discussed earlier, the excess adhesive means (which will be minimal) will be allowed to flow into the staggered cores, such as core 56.

The preferred material for the flanges 14 and 16 is an engineering thermoplastic, for example, polyethersolphone, polycarbonate, polyetheretherketone (peek), polyphenylene sulfide (pps), polyetherimide (pei) and other thermoplastic materials having suitable properties. These materials are selected for their physical, chemical and thermal properties. The most important of these properties are impact strength, light transmission, surface hardness, deflection, temperature range and cleaning solvent resistance.

A preferred adhesive means is two-component epoxy adhesive because of its physical strength and short set up and curing time. Although such adhesives are preferred, it is within the scope of the invention to use a solvent bond which exhibits sufficient shear and tensile strength. Such adhesives are known to those skilled in the art.

Other modifications and changes in the present invention will become apparent to those skilled in the art from the foregoing description. All such modifications or changes coming within the scope of the appended claims are intended to be included therein.

What is claimed is:

1. A reel for magnetic recording tape comprising:
   a hub of cylindrical configuration having an outside circumference and parallel end surfaces, an outer circumferential portion of each end surface defining attachment areas;
   a pair of parallel spaced apart, disk shaped flanges each having an opening therethrough, an inner circumferential portion of said flange thereof defining a contact surface complementary to the attachment area of said hub, said contact surfaces each having a pair of radially spaced circumferential ridges defining an annular region therebetween, said ridges being in contact with said attachment areas, said ridges being thin relative to the thickness of said flanges defining energy directors allowing ultrasonic welding of said flanges to said hub, the entire circumference of each ridge being welded to said attachment area to encapsulate said annular regions; and
   adhesive means within said annular regions to permanently attach said flanges to said hub, said adhesive means being contained within said annular regions to prevent said adhesive means from migrating radially outwardly toward said flanges and tape that may be wound onto said hub between said flanges.

2. A reel as in claim 1 wherein said attachment area of said hub is axially recessed to allow said flanges to fit flush with respect to said end surfaces of said hub.

3. A reel as in claim 1 wherein said flanges are formed from an engineering plastic having sufficient light transmission properties to allow an unimpaired view of the region between said flanges.

4. A reel as in claim 2 wherein said attachment area includes a retention groove opposite the contact surfaces and between the ridges in which the adhesive means is positioned.

5. A reel as in claim 4 wherein said hub includes circumferentially staggered recesses, said recesses alternating from one end surface to the other to accommodate fabrication of the hub, said recesses providing regions for excess adhesive means to flow when forced by ultrasonic welding of said energy directors.

6. A reel as in claim 5 wherein said flanges are formed from an engineering plastic having sufficient light transmission properties to allow an unimpaired view of the region between said flanges.

7. A reel as in claim 4 wherein said flanges are formed from an engineering plastic having sufficient light transmission properties to allow an unimpaired view of the region between said flanges.

8. A reel as in claim 1 wherein said attachment area includes a retention groove opposite the contact surfaces and between the ridges in which the adhesive means is positioned.

9. A reel as in claim 8 wherein said hub includes circumferentially staggered recesses, said recesses alternating from one end surface to the other to accommodate fabrication of the hub, said recesses providing regions for excess adhesive means to flow when forced by ultrasonic welding of said energy directors.

10. A reel as in claim 9 wherein said flanges are formed from an engineering plastic having sufficient light transmission properties to allow an unimpaired view of the region between said flanges.

11. A reel as in claim 8 wherein said flanges are formed from an engineering plastic having sufficient light transmission properties to allow an unimpaired view of the region between said flanges.

* * * * *